United States Patent [19]

Furuno

[11] Patent Number: 5,118,787

[45] Date of Patent: Jun. 2, 1992

[54] MODIFICATION METHOD OF SYNTHETIC RESINS AND MODIFIED SYNTHETIC RESINS

[75] Inventor: Nobuo Furuno, Amagasaki, Japan

[73] Assignee: Fine Clay Co., Ltd., Japan

[21] Appl. No.: 551,096

[22] Filed: Jul. 11, 1990

[30] Foreign Application Priority Data

Jul. 13, 1989 [JP] Japan .................................. 1-181339

[51] Int. Cl.$^5$ .............................................. C08F 6/16
[52] U.S. Cl. .................................... 528/482; 528/485; 528/486; 528/487; 528/488; 528/489
[58] Field of Search ............... 528/482, 485, 486, 487, 528/488, 489

[56] References Cited

U.S. PATENT DOCUMENTS

| | | | |
|---|---|---|---|
| 4,292,424 | 9/1981 | Huddleston, Jr. et al. | 523/310 |
| 4,293,474 | 10/1981 | Dieterich et al. | 524/591 |
| 4,546,144 | 10/1985 | Knight | 524/437 |

FOREIGN PATENT DOCUMENTS

| | | |
|---|---|---|
| 59-166568 | 9/1984 | Japan . |
| 59-173296 | 10/1984 | Japan . |
| 59-184266 | 10/1984 | Japan . |
| 60-65077 | 4/1985 | Japan . |
| 1-501553 | 6/1989 | Japan . |

*Primary Examiner*—Paul R. Michl
*Assistant Examiner*—Andrew E. C. Meriam
*Attorney, Agent, or Firm*—Lowe, Price, LeBlanc & Becker

[57] ABSTRACT

A method of modifying a synthetic resin comprises treating a solution or dispersion of the synthetic resin containing water-soluble electrolytes as impurities is treated with basic or acidic, water-insoluble fine particles which have been purified and classified, whereby cations having origin in the electrolytes are fixed in the acidic fine particles or anions having origin in the electrolytes are fixed in the basic fine particles. Synthetic resins modified in accordance with the modification method are produced.

8 Claims, No Drawings

MODIFICATION METHOD OF SYNTHETIC RESINS AND MODIFIED SYNTHETIC RESINS

BACKGROUND OF THE INVENTION

1) Field of the Invention

The present invention relates to modified synthetic resins, in which electrolytes (ionic impurities) contained in synthetic resins are fixed in water-insoluble fine particles, thereby preventing the electrolytes from adversely affecting the resins electrical properties and the like, and to a method of modifying the synthetic resins.

The modified synthetic resins containing the water-insoluble fine particles according to this invention exhibit reduced adverse effects caused by corrosive ions introduced from the outside or halogen ions liberated from halogen-containing synthetic resins and are suitable for use as paints, sealing compounds, films, various molded or formed products, etc.

2) Description of the Related Art

Synthetic resins contain electrolytes (ionic impurities) having origin in catalysts used in their polymerization reactions and salts produced secondarily. These synthetic resins are subjected to a process for the removal of the impurities by washing or the like after completion of the polymerization reactions. However, the impurities cannot be perfectly removed, and the electrolytes remain therein in amounts of several tens—several hundreds ppm or in some cases, several thousands ppm in terms of NaCl.

For example, a bisphenol type epoxy resin is synthesized by subjecting bisphenol A and epichlorohydrin to a polymerization reaction in the presence of sodium hydroxide. Sodium chloride produced secondarily by this polymerization reaction remains in the resin an extremely small amount. A polyolefin resin synthesized making use of a Ziegler-Natta catalyst contains a small amount of the catalyst therein. Such a catalyst is an elctrolyte which is soluble in water to ionically dissociate.

These electrolytes in small amounts adversely affect the electrical properties of the synthetic resins and cause films, coatings and other molded or formed products thereof to deteriorate. In addition, when the synthetic resin is used in contact with metals as paints, sealing compounds, additives, films and the like, the electrolytes cause corrosion.

When an epoxy resin, in which a small amount of electrolytes remain, is used in an electro-coating paint by way of example, anodic dissolution is caused by chloride ions. In anionic electrodeposition coating, performance of a coating film is impaired. In cationic electrodeposition coating in which a coating film is formed on a cathode, chloride ions cause the coating device serving as an anode to corrode. Moreover, the presence of alkali cations such as Na+ causes the cathodic exfoliation of the coating film in the cationic electrodeposition coating. The cathodic delamination causes the coating film to separate under a wet environment. With respect to a coated steel sheet exposed to a seaside environment in particular, scab-like rust extends from its processed or cut parts and coating flaws. It is therefore necessary to prevent the electrolytes from remaining in both anionic and cationic electrodeposition coatings.

When a paint is applied on a metal, the corrosion of the metal occurs from pinholes of the coating film and its edges. The cause is attributed to the fact that electrolytes localize into anions and cations underneath the coating film, thereby causing electrical polarization to form local cells. The electrolytes in this case include corrosive impurity ions, which have entered from the external environment after the coating, other than those remaining in the synthetic resin, said ions greatly affecting the corrosion.

Vinyl chloride resins, fluorine-containing resins, halogen-modified resins and the like are accompanied further by a problem that electrolytes are incorporated therein in the course of their synthesis and at the same time, bound halogen atoms decomposedly liberate therefrom with time to form halogen ions incorporated therein.

In some application fields, the synthetic resins have recently been required to be highly purified. In the field of sealing compounds for semiconductors by way of example, it has been attempted to use super-purified water in washing the synthetic resins after their synthesis. The super-purified water is very expensive, and the electrolytes cannot be eliminated sufficiently by a washing process only.

Although it has been proposed to remove corrosive ions in an electro-coating paint by an ion-exchange resin [Japanese Patent Application Laid-Open No. 173296/1984 and Japanese Patent Application Kohyo (through PCT) No. 501553/1989], recovery and regeneration processes of the ion-exchange resin in the form of particles are complicated.

In addition, it has been proposed to add high-gelatinized cation-exchanger adsorbed with hydrogen ions, which may be partially substituted with heavy metal ions, to an electro-coating paint (Japanese Patent Application Laid-Open No. 65077/1985) or to add a cationic resin adsorbed with the oxo acid anions of a heavy metal to an electro-coating paint (Japanese Patent Application Laid-Open No. 184266/1984). However, conventional ion exchangers have only an insufficient function for fixing the electrolytes because of insufficient purification of such fine particles, and also have only an insufficient effect for reducing the influence of the impurity ions which entered from the external environment.

Attention has been given to particles of an anion exchanger as an improver by which chloride ions in synthetic resins are fixed to render the ions harmless. For example, hydrotalcite particles undergo an ion-exchange reaction to fix anions present in a synthetic resin when they are melted and mixed with the synthetic resin. However, conventional particles having ion-exchange function such as hydrotalcite particles are generally often coagulated. Therefore, their uniformly-dispersing ability is poor and their ion-exchange reactivity is low, so that they exhibit their fixing action for the impurity ions for the first time by their melting and kneading at an elevated temperature.

It has been proposed to prevent filiform corrosion by causing these hydrotalcite particles to contain in a film-forming component (Japanese Patent Application Laid-Open No. 166568/1984). However, this method can cope with filiform corrosion occurring under a relatively dry environment, but cannot prevent the separation of the coating film and the occurrence of scab-like rust under a wet environment. In addition, since the conventional hydrotalcite particles are unpurified fine particles, electrical properties are impaired when their proportion is too great. It is however difficult to suitably determine their proportional conditions.

OBJECT AND SUMMARY OF THE INVENTION

An object of the present invention is to provide a modified synthetic resin which has been prevented from undergoing adverse effects due to water-soluble electrolytes remaining therein.

Another object of the present invention is to provide a modified synthetic resin in which adverse effects caused by corrosive ions entered from the outside or halogen ions liberated from halogen-containing synthetic resins have been reduced.

The present inventor has carried out an extensive investigation with a view toward overcoming the above-described problems of the prior art. As a result, it has been found that when highly purified water-insoluble fine particles are used, ionic impurities contained in synthetic resins can be easily fixed therein.

Namely, when a solution or dispersion of a synthetic resin is treated with purified, basic or acidic, water-insoluble fine particles which have an electrical conductivity ($\mu$S/cm) within a specific range in a suspension state, cations having origin in the electrolytes in the synthetic resin can be fixed in the acidic fine particles, while anions having origin in the electrolytes in the synthetic resin can be fixed in the basic fine particles.

According to this method, any high-temperature treatments of the resin, such as those in melting and kneading conditions are not required unlike known particles having ion-exchange function. Impurity ions can be fixed in the water-insoluble fine particles by subjecting the synthetic resin in the state of the solution or dispersion to a contact treatment under relatively low-temperature conditions.

The ionic impurities fixed once in the water-insoluble fine particles are not liberated under usual conditions for use.

The water-insoluble fine particles according to this invention have been highly purified and contain only a few agglomerates. Therefore, when the modified synthetic resin containing the fine particles is formed into a coating film or another molded or formed product, the layer structure characteristic of the fine particles serves effectively to diffuse impurity ions introduced from the outside or halogen ions liberated from halogen-containing synthetic resin, so that electric polarization and formation of local cells, both caused by the localization of anions and cations, are reduced, preventing the corrosion of metal coming into contact with the synthetic resin, deterioration of the coating film and the like.

The present invention has been led to completion on the basis of these findings.

In one aspect of the present invention, there is thus provided a method of modifying a synthetic resin, characterized in that a solution or dispersion of a synthetic resin containing water-soluble electrolytes as impurities is treated with basic or acidic, water-insoluble fine particles which have an electrical conductivity ($\mu$S/cm) satisfying the following inequality [I] or [II] when measured as an aqueous suspension having a concentration of 25 wt. %, whereby cations having origin in the electrolytes are fixed in the acidic fine particles and/or anions having origin in the electrolytes are fixed in the basic fine particles:

[I] the case of the basic fine particles:

$Y < 0.01983 \times 10^{(X-7)} + 50$; and

[II] the case of the acidic fine particles:

$Y < 0.03498 \times 10^{(7-X)} + 50$ wherein Y means an electrical conductivity ($\mu$S/cm) and X denotes the pH of the aqueous suspension.

DETAILED DESCRIPTION OF THE INVENTION

Synthetic Resin

The synthetic resins used in the present invention are resins for molding or forming various molded products, sheets, films and the like and film-forming resins such as for paints, and may mention, for example, epoxy resins, acrylic resins, polyester resins, polycarbonate resins, polyvinyl chloride resins, polyvinylidene fluoride resins, polyphenylene ether resins, polyolefin resins, polybutadiene, acetylene.butadiene copolymer, halogenated resins and the like. These resins may be mixed with one another and contain any natural polymer such as natural rubber.

In this invention, each of the synthetic resins is used as a solution or dispersion in a solvent. Since the synthetic resin is treated with water-insoluble fine particles under relatively low-temperature conditions to fix impurity ions therein, the modification may be conducted even on synthetic resins such as decomposed or deteriorated at elevated temperatures or in an emulsions state.

It is preferable that the synthetic resin to be treated with the water-insoluble fine particles is not mixed with any additives such as fillers, colorants and stabilizers prior to its treatment. In the case of thermosetting resins in particular, it is necessary that any hardeners, cross-linking agents, auxiliaries and other co-components are not incorporated.

Water-Insoluble Fine Particles

The water-insoluble fine particles useful in the practice of this invention are basic or acidic, water-insoluble fine particles having an electric conductivity satisfying the inequality [I] or [II] as measured as an aqueous suspension having a concentration of 25 wt. %.

Such purified water-insoluble fine particles can be obtained in accordance with the production process of purified pigments, which has previously been proposed by the present inventor (Japanese Patent Application No. 92278/1990, U.S. patent application Ser. No. 07/505,389, EP Patent Application No. 90303789.3).

In a conventional production process of water-insoluble particles such as a pigment, a deflocculant is added to an aqueous dispersion of the particles to deflocculate the particles. Alternatively, a coagulant is added to the dispersion to coagulate and sediment the particles. Therefore, the process cannot avoid the inclusion of small amounts of electrolytes. The pigment particles are coagulated in the presence of the electrolytes. Further, the addition of the pigment particles containing the electrolytes to a paint will result in corrosion and rusting of the coated metal and deterioration of the coating film.

In the above-mentioned patent application, the present inventor has proposed a production process of purified pigment, which can be recovered or concentrated without using an aggregating agent such as a coagulant or flocculant and from which electrolytes have been either completely or partly eliminated.

In such a process, a purified pigment is produced by roughly dividing particles of a pigment into either acidic particles or basic particles and then subjecting them to a specific ion-exchange treatment.

In the case of acidic particles such as kaolinite by way of example, an aqueous dispersion of the pigment particles is brought into contact with an OH-type anion-exchange resin, thereby exchanging anions (impurity ions), which are present in the aqueous dispersion, with $OH^-$ ions to raise the pH of the aqueous dispersion to 8 or higher. An aqueous dispersion in which the pigment particles have been deflocculated is thus obtained. This aqueous dispersion is then left at rest to classify the pigment particles by collecting an upper portion of the resulting aqueous dispersion, said portion being located within a predetermined depth range. When collecting the upper portion of the aqueous dispersion corresponding to Storks diameters of, for example, 2 $\mu$m or smaller, particles having particle sizes of 2 $\mu$m or smaller can be classified. The aqueous dispersion thus collected is then brought into contact with an H-type cation-exchange resin, thereby exchanging cations (counter ions) with $H^+$ ions to lower the pH of the aqueous dispersion to 6 or lower. As a result, $H^+$ and $OH^-$ are combined to each other to form $H_2O$, thereby obtaining a deionized and purified aqueous dispersion. When the thus-obtained aqueous dispersion is left at rest, the pigment particles rapidly sediment without the addition of any coagulant, thereby permitting the concentration of the aqueous dispersion. The concentration may be conducted by means of a centrifugal separator.

In the case of basic particles such as hydrotalcite, an aqueous dispersion of the pigment particles is brought into contact with an H-type cation-exchange resin, thereby exchanging cations (impurity ions), which are present in the aqueous dispersion, with $H^+$ ions to lower the pH of the aqueous dispersion to 6 or lower. An aqueous dispersion in which the pigment particles have been deflocculated is thus obtained. When this aqueous dispersion is left at rest to collect an upper portion of the aqueous dispersion corresponding to Storks diameters of, for example, 2 $\mu$m or smaller, particles having particle sizes of 2 $\mu$m or smaller can be classified. The aqueous dispersion thus collected is then brought into contact with an OH-type anion-exchange resin, thereby exchanging anions (counter ions) with $OH^-$ ions to raise the pH of the aqueous dispersion to 8 or higher. As a result, $H^+$ and $OH^-$ are combined to each other to form $H_2O$, thereby obtaining a deionized and purified aqueous dispersion. When the thus-obtained aqueous dispersion is left at rest, the pigment particles rapidly sediment without the addition of any coagulant, thereby permitting the concentration of the aqueous dispersion.

The above-described process is a process, wherein a purified pigment is provided by paying attention to the polarity of particles of a pigment and devising the elimination order of impurity ions (or counter ions) contained in the pigment particles, as opposed to the conventional process wherein a deflocculant and/or coagulant is added.

The thus-obtained purified pigment is easily dispersed without becoming a hard cake. These particles are roughly divided into acidic and basic particles and classified to fine particles. They hence have high ion-exchange function and excellent dispersing property in a synthetic resin.

In order to define the water-insoluble fine particles thus purified in this invention, the amount of electrolytes, which are contained in the fine particles, has been provided by an electrical conductivity ($\mu$S/cm).

Since the electrical conductivity is proportional to the total ion concentration, the purification degree of the fine particles becomes higher as the value of the electrical conductivity is smaller. However, if the value of pH is not constant, it is impossible to correctly indicate the concentration of the electrolytes (impurity ions) by the electrical conductivity alone because the equivalent conductivities of hydrogen ions ($H^+$) and hydroxyl ions ($OH^-$) are 349.8 and 198.3 and the electrical conductivities of these hydrogen ions or hydroxyl ions are greatly dependent on the value of pH.

When an aqueous suspension of fine particles is prepared at a concentration of 25 wt. %, the electrical conductivity based on impurity ions other than hydrogen ions and hydroxyl ions should be lower than 50 $\mu$S/cm. Therefore, the tolerance of the electrical conductivity depending on the value of pH is defined as follows:

[I] the case of the basic fine particles:

$$Y < 0.01983 \times 10^{(X-7)} + 50; \text{ and}$$

[II] the case of the acidic fine particles:

$$Y < 0.03498 \times 10^{(7-X)} + 50$$

wherein Y means an electrical conductivity ($\mu$S/cm) and X denotes the pH of the aqueous suspension.

Exemplary calculated values of the electrical conductivities depending on variations of the value of pH are shown below.

for $X = 11$, $Y < 0.01983 \times 10^{(11-7)} + 50$ for $X = 10$, $Y < 0.01983 \times 10^{(11-7)} + 50$ for $X = 9$, $Y < 0.01983 \times 10^{(9-7)} + 50$ for $X = 8$, $Y < 0.01983 \times 10^{(8-7)} + 50$ for $X = 7$, $Y < 0.01983 \times 10^{(7-7)} + 50$ for $X = 6$, $Y < 0.03498 \times 10^{(7-6)} + 50$ for $X = 5$, $Y < 0.03498 \times 10^{(7-5)} + 50$ for $X = 4$, $Y < 0.03498 \times 10^{(7-4)} + 50$ for $X = 3$, $Y < 0.03498 \times 10^{(7-3)} + 50$ The reason why the electric conductivity based on the electrolytes (impurity ions) is set to lower than 50 $\mu$S/cm is that the aggregation of the water-insoluble fine particles can be disregarded where the electrolytes are contained in an amount which is expressed by such a degree of an electrical conductivity, that when they are used in the treatment of a synthetic resin, such fine particles can exhibit high ion-exchange function, thereby easily fixing impurity ions in the synthetic resin, and that a final product such as a coating film, which has been obtained by using a paint containing such fine particles, can exhibit reduced adverse effects caused by impurity ions introduced from the external environment.

Although such a constant has been set to 50 $\mu$S/cm, it is preferable that it is set to 40 $\mu$S/cm, more preferably, 30 $\mu$S/cm. If necessary, the constant of 1 $\mu$S/cm may be achieved.

The fine particles according to this invention are those having an average particle size of 20 μm or smaller, preferably 6 μm or smaller, more preferably 2 μm or smaller.

The term "average particle size" of the fine particle as used herein means a value on the basis of the Stokes diameters in a state that the water-insoluble fine particles are deflocculated. Namely, in the acidic particles, when the pH of the aqueous dispersion thereof is raised to at least 8, the particles are deflocculated as described above. When the aqueous dispersion in which the fine particles have been deflocculated is then left over for a predetermine period of time to classify the fine particles by a method collecting an upper portion of the aqueous dispersion, said portion being located within the depth corresponding to Storks diameters of, for example, 2 μm or smaller, fine particles having an average particle size of 2 μm or smaller can be obtained.

The feature of the present invention resides in that the water-insoluble fine particles useful in the practice of this invention are roughly divided into either basic particles (solid base) or acidic particles (solid acid) in accordance with their polarity.

The basic fine particles are deflocculated at a pH of 6 or lower and coagulated and sedimented at a pH of 8 or higher when in a state of an aqueous dispersion. As exemplary basic fine particles, may be mentioned basic clay minerals such as hydrotalcite and talc; hydroxyl-containing compounds of metals such as magnesium, aluminum, zinc, lead, iron and copper; carbonate-containing compounds of metals such as calcium, zinc, lead and iron; fine particles of anion-exchange resins; and mixtures thereof.

The acidic fine particles are deflocculated at a pH of 8 or higher and coagulated and sedimented at a pH of 6 or lower when in a state of an aqueous dispersion. As exemplary acidic fine particles, may be mentioned acidic clay minerals such as kaolinite, pyrophyllite, bentonite, montmorillonite, imogolite, zeolite, sericite, vermiculite and pearlite; the oxides of metals; fine particles of cation-exchange resins; and mixtures thereof.

Incidentally, as exemplary fine particles of the anion-exchange resins and cation-exchange resins, fine particles of carbonate ion-type anion-exchange resins and fine particles of ammonium ion-type cation-exchange resins are preferred respectively from the viewpoint of fixing electrolytes contained in resins because these particles concerned with volatile carbonic acid or ammonia have a merit that an ion-exchange reaction is caused to proceed promptly. With respect to the effect of reducing adverse effects of corrosive ions introduced from the external environment, it is not necessary to specify ion species forming a counterpart to the ion-exchange group. In this respect, this invention also differs from the prior art wherein a particular oxo acid anion or heavy metal cation is required. Fine particles of ion-exchange resin free of any heavy metals are preferred from the viewpoint of antipollution measure. Each of these purified fine particles of the ion-exchange resins can be generally obtained by finely grinding an ion-exchange resin having a particle size of about 1 mm and treating the thus-ground particles with an ion-exchange resin in the same manner as the above-described treatment process as to the pigment particles.

Modification Method

In the present invention, the modification of a synthetic resin is performed by treating the synthetic resin containing water-soluble electrolytes as impurities in a state of a solution or dispersion with the basic or acidic, water-insoluble fine particles.

The synthetic resin is treated in a state of a solution or dispersion (including an emulsion) in a solvent.

The treatment with the water-insoluble fine particles is generally carried out by adding the fine particles to the solution or dispersion of the synthetic resin and mixing them. Although dry fine particles may be used as the water-insoluble fine particles, it is preferable from the standpoint of their handling that they are used as a 10–50 wt. % dispersion (suspension) in water and/or an organic solvent.

Described specifically, 0.3–300 parts by weight (in terms of solids) of the basic or acidic water-insoluble fine particles are added to the solution or dispersion containing 100 parts by weight of the synthetic resin so as to treat the synthetic resin at a temperature lower than the temperature at which the synthetic resin is decomposed or hardened.

Although the purified water-insoluble fine particles have ion-exchange function, its ion-exchange reaction with the impurity ions contained in the synthetic resin under ambient pressure requires heating of the reactants to a certain temperature. Therefore, in order to avoid the deterioration of the synthetic resin and dispersion or to conduct the ion-exchange reaction with high efficiency, the treatment may be performed under reduced pressure. In the case of an emulsion by way of example, it is preferred that the treatment is conducted at reduced pressure and room temperature so as to prevent the emulsion from breaking.

As a modification process, there is a process wherein the basic or acidic water-insoluble fine particles are added while a solution or dispersion of the synthetic resin is heated or decompressed to evaporate the solvent and the evaporated gas is condensed and refluxed. In this case, fine particles of a carbonate ion-type anion-exchange resin or ammonium ion-type cation-exchange resin are added as an index material to the solution or dispersion of the synthetic resin and the solution or dispersion is then heated and/or decompressed to evaporate and then reflux the solvent. As a result, the presence of carbon dioxide gas or ammonia gas in the evaporated gas is detected. Then, the synthetic resin is treated with the water-insoluble fine particles until the carbon dioxide gas or ammonium gas is reduced to 12 ml (0.5 mole) or less, in other words, about 30 ppm or less in terms of NaCl, per kg of the synthetic resin or preferably, becomes undetected, whereby the degree of modification of the synthetic resin can be known.

Namely, the fact that the presence of the carbon dioxide gas or ammonia gas is not detected indicates the absence of active chloride ions or sodium ions exchanged with carbonate ions or ammonium ions, whereby the degree of modification of the synthetic resin can be quantified. In addition, the proportion of the water-insoluble fine particles, which is required to fix the ionic impurities, can also be specified.

Modified Synthetic Resin

A modified synthetic resin in this invention is such that impurity ions attributable to electrolytes contained in a synthetic resin are fixed in the water-insoluble fine particles added. Accordingly, the modified synthetic resin is used for various applications as resin compositions containing the water-insoluble fine particles according to the proportions of the fine particles.

When the modified resin (composition) containing a great amount of the water-insoluble fine particles is blended with another synthetic resin containing water-soluble electrolytes and the resultant blend is subjected to a heat treatment within a temperature range not to harden, deteriorate and decompose these synthetic resins, optionally, under reduced pressure, impurity ions attributable to electrolyte contained in the latter synthetic resin can be fixed.

In the above manner, with the respect to the synthetic resins treated with the water-insoluble fine particles having anion-exchange function, corrosive ions such as $Cl^-$ attributable to electrolytes in the synthetic resins are fixed in the fine particles.

With the respect to the synthetic resins treated with the water-insoluble fine particles having a cation-exchange function on the other hand, cations such as $Na^+$ attributable to electrolytes in the synthetic resins are fixed in the fine particles and the function of preventing the localization of $Na^+$ is imparted, thereby permitting the provision of, for example, paints which do not undergo cathodic exfoliation even when they are applied to a cationic electrodeposition coating.

Both anions and cations attributable to electrolytes in a synthetic resin can be fixed in the fine particles by successively treating the synthetic resin with the basic and acidic fine particles. Alternatively, a synthetic resin treated with the basic fine particles may be blended with another synthetic resin treated with the acidic fine particles.

Since the water-insoluble fine particles highly classified are uniformly dispersed in the modified synthetic resins according to the present invention, the layer structure characteristic of the fine particles effectively functions. Therefore, when such a resin dispersion is coated on a metal as a paint by way of example, the coating film formed can cause corrosive ions introduced from the outside to disperse so as to prevent both anions and cations from localizing to polarize. Besides, the modified resins disperse halogen ions decomposedly liberated from synthetic resins.

According to the present invention, the following excellent advantageous effects are brought about. Since electrolytes (ionic impurities such as chloride ions) in synthetic resins can be bonded chemically and firmly to fine particles, the impurity ions cannot be liberated from the synthetic resins under usual conditions for use and hence adverse effects are not exerted by the impurity ions.

The modified synthetic resins according to the present invention are used for respective intended ends with water-insoluble fine particles contained therein, as needed, after removing water and respective solvents. At this time, any additives, for example, one or more hardeners, fillers, colorants, etc. may be added if necessary.

EMBODIMENTS OF THE INVENTION

The present invention will hereinafter be described specifically by the following examples and comparative experiments. Incidentally, all designations of "part" or "parts" and "%" as will be used in the following examples and comparative experiments mean part or parts by weight and wt. % unless otherwise provided.

Comparative Experiment 1

(Experiment for analyzing chloride ions extracted from an epoxy resin)

A commercially-available epoxy resin for an anticorrosive paint, which had an epoxy equivalent of 500 and a softening point of 80° C., was dissolved in butyl cellosolve as a solvent into a solution having a concentration of 50%.

The solution in an amount corresponding to 10 g (in terms of solids) of the epoxy resin was charged in a 200-ml glass beaker, to which 90 g of deionized water was added. After heating for 2 hours in a water bath, the epoxy resin was removed using a filter paper to obtain extract-containing water.

To the extract-containing water, was added nitric acid to acidfy the water, followed by drop-wise addition of an aqueous solution of silver nitrate. The extract-containing water became cloudy and was hence found to contain about 100 ppm chloride ions. Reduced from the quantitative ratio of the epoxy resin to the deionized water in the extraction process, it is found that the epoxy resin contains at least about 1,000 ppm of chloride ions.

If such an extraction process is conducted repeatedly, chloride ions can be removed from the epoxy resin to a considerable extent. It is however apparent that the process is extremely expensive.

Comparative Experiment 2

(Experiment for fixing chloride ions with commercial hydrophobic hydrotalcite)

Commercially-available hydrotalcite ("DHT 4A", product of Kyowa Chemical Industry Co., Ltd.) was added to the same solution of the epoxy resin as described above in a proportion of 20 parts by weight based on 80 parts by weight of the epoxy resin.

In general, this hydrotalcite is hydrophobic and does not disperse in water, but easily disperses in any synthetic resin. It is hence used as a modifier.

With respect to the solution of the epoxy resin, to which had been added the hydrotalcite, the presence of chloride ions was investigated by conducting extraction with deionized water in the same manner as in Comparative Experiment 1. As a result, it was found that the concentration of the chloride ions was the same as that of the original epoxy resin free of hydrotalcite.

Namely, even if the commercially-available hydrophobic hydrotalcite was added, the chloride ions contained in the epoxy resin were not fixed in the hydrotalcite at room temperature.

Comparative Experiment 3

The solution of the epoxy resin, which had been obtained in Comparative Experiment 2 and added with the hydrophobic hydrotalcite, was heated in a glass flask.

The gas generated was taken out of a side port of the flask and introduced into lime water to investigate the occurrence of cloudiness. No cloudiness occurred even when heated for 4 hours in an oil bath at 180° C. When the solvent was evaporated out and the residue was heated to 250° C., cloudiness occurred at last in spite of a little, whereby the generation of carbon dioxide gas was recognized. Namely, in the commercially-available hydrophobic hydrotalcite, an ion-exchange reaction between chloride ions and carbonate ions scarcely occurred at room temperature. It was possible to fix chloride ions only when the solution of the epoxy resin was heated to a considerably high temperature. Therefore, the commercially-available hydrophobic hydrotalcite is not suitable for modification of resins for paints which require relatively low-temperature baking and drying, to say nothing of cold-drying paints.

Comparative Experiment 4

Hydrotalcite was deposited by heating magnesium hydroxide, aluminum hydroxide and sodium carbonate under stirring by a method known per se in the art. The deposit was washed with water and concentrated by a centrifugal separator, thereby obtaining an aqueous slurry $S_1$ of hydrotalcite at a concentration of 25%.

The pH and electrical conductivity of the slurry $S_1$ were 9.5 and 325 $\mu S/cm$ respectively.

A glass flack equipped with a reflux condenser was charged with the butyl cellusolve solution (concentration: 50%) of the epoxy resin, which had been prepared in Comparative Experiment 1. The slurry $S_1$ was added dropwise while heating the solution in an oil bath at 180° C. to reflux the solvent. The gas generated was taken out of a side port of the flask and introduced into lime water to investigate the occurrence of cloudiness. As a result, cloudiness slightly occurred, whereby the generation of carbon dioxide gas was recognized. However, its amount was only a little.

Namely, it was impossible to obtain an epoxy resin, in which chloride ions were fixed, even when using the hydrotalcite synthesized by the method known per se in the art.

EXAMPLE 1

A portion of the 25% aqueous slurry $S_1$ of hydrotalcite, which had been obtained in Comparative Experiment 4, was diluted with water into a 3% slurry.

An H-type cation-exchange resin ("Duolite C20", trade name; product of Sumitomo Chemical Co., Ltd.) was added to the thus-obtained slurry, followed by cation-exchange treatment under stirring until the pH of the slurry dropped to 4.6. In the above manner, sodium ions, magnesium ions, aluminum ions, etc. in the slurry were ion-exchanged with $H^+$ to adsorb and remove them.

After filtering the H-type cation-exchange resin off, aggregates of hydrotalcite particles were also defloculated, thereby obtaining a uniform dispersion. An upper portion of the dispersion, which corresponded to Stokes diameters of 2 $\mu m$ or smaller and was in a range of from the water level to the depth of 40 cm for a sedimentation time of 40 hours, was collected. To the dispersion thus collected, was added an OH-type anion-exchange resin ("Duolite A101", trade name; product of Sumitomo Chemical Co., Ltd.), so that the dispersion was subjected to an anion-exchange treatment wherein free anions were exchanged with $OH^-$. As a result, the pH of the dispersion was stabilized at 8.4.

When the OH-type anion-exchange resin used was filtered off and the resultant dispersion was left at rest, fine particles of hydrotalcite rapidly sedimented. The fine particles were concentrated by a centrifugal separator, thereby permitting the recovery of an aqueous slurry $S_2$ having a concentration of 25%. The electrical conductivity and pH of the slurry $S_2$ were 23 $\mu S/cm$ and 8.4 respectively.

In a similar manner to Comparative Experiment 4, a glass flask was charged with a butyl cellusolve solution (concentration: 50%) of the epoxy resin and the slurry $S_2$ was added dropwise while heating the solution in an oil bath at 180° C. to reflux the solvent. At the same time as the addition of the slurry $S_2$, cloudiness of lime water, which was 10 caused by the gas generated, was observed. When the addition was stopped, no cloudiness was recognized. Namely, it is understood that an ion-exchange reaction occurs at the same time as the addition of the slurry $S_2$ and completes rapidly.

When the slurry $S_2$ was continuously added until the hydrotalcite fine particles added were 23 g per kg of the epoxy resin, the cloudiness of the lime water, which was caused by the generation of carbon dioxide gas became unrecognized. Therefore, it can be considered that all the active anions contained in the epoxy resin and being able to undergo an ion-exchange reaction with the hydrotalcite fine particles are ion-exchanged, so that they are fixed in the hydrotalcite fine particles.

Indeed, it was attempted to extract chloride ions from the solution of the epoxy resin thus modified with deionized water in a similar manner to Comparative Experiment 1. As a result, no presence of any chloride ions was recognized on the test with silver nitrate. Even when deionized water used in conducting the extraction process was analyzed on ion-exchange chromatography, no difference from the concentration of chloride ions in the original deionized water was detected.

From the results described above, it is understood that the chloride ions in the epoxy resin are substantially completely fixed in the hydrotalcite fine particles highly purified.

EXAMPLE 2

Preparation of fine particles of a carbonate ion-type anion-exchange resin

After carbon dioxide gas was brought into contact with an OH-type anion-exchange resin ("Duolite A101", trade name; product of Sumitomo Chemical Co., Ltd.), the resin was ground in a pot mill.

Water was added to the resin thus ground into a slurry having a concentration of 3%, to which an H-type cation-exchange resin was added to adsorb and remove sodium ions in the slurry. The H-type cation-exchange resin was then filtered off. The particles were defloculated, so that a uniform dispersion (pH: 4.5) was obtained.

This dispersion was left at rest and an upper portion of the dispersion, which corresponded to Stokes diameters of 2 $\mu m$ or smaller was then collected. To the dispersion thus collected, was added an OH-type anion-exchange resin, so that the dispersion was subjected to an anion-exchange treatment. The OH-type anion-exchange resin used was then filtered off.

When the resultant dispersion was left at rest, fine particles of a carbonate ion-type anion-exchange resin rapidly sedimented. These fine particles were recovered as an aqueous slurry $S_3$ having a concentration of 25% by a centrifugal separator. The electrical conductivity and pH of the slurry $S_3$ were 27 $\mu S/cm$ and 8.3 respectively.

The ion-exchange capacity of the carbonate ion-type anion-exchange resin were determined as follows. A side-arm flask was charged with 0.1 % (1,000 ppm) brine. The above-obtained slurry $S_3$ was added dropwise to the brine while boiling and refluxing the latter. Right after the dropping, bubbling attributable to the generation of carbon dioxide gas was recognized. When the amount of the gas generated became a little, the gas was introduced into lime water to determine whether carbon dioxide gas was generated or not. The moment the carbon dioxide gas could not be detected by this method was defined as the end point of the reaction. As a result, it was confirmed from the amount of the slurry $S_3$ added dropwise that 1 l of the slurry $S_3$ underwent an ion-exchange reaction with 200 milli-equivalent (7 g) of chloride ions. This value was the same as the value of the ion-exchange capacity of the hydrotalcite fine particles in Example 1.

Determination of chloride ions in the epoxy resin

The fine particles of the above-obtained carbonate ion-type anion-exchange resin cause ion-exchange reaction to be advanced quantitatively in an aqueous system.

A flask was charged with a butyl cellosolve solution of an epoxy resin (concentration: 50%, solids content: 1 kg). Under refluxing the solvent in an oil bath at 180° C., the slurry $S_3$ was added dropwise by a quantitative buret to conduct the determination of chloride ions in the resin, defining the moment no carbon dioxide gas became generated as the end point of the reaction. When the amount of the slurry $S_3$ added dropwise was about 150 ml, no cloudiness occurred even when the gas generated was introduced into lime water.

On the other hand, a purified epoxy resin, in which chloride ions had been eliminated by sufficient extraction with deionized water, was added with a predetermined amount of chlorinated amine to prepare a standard sample containing a known amount of chloride ions, thereby determining the proportion of the slurry $S_3$ reacting with the chloride ions. As a result, the ion-exchange capacity of the slurry $S_3$ as an index was found to correspond to 7 ppm of chloride ions per ml and to have a sufficient analytical precision.

Accordingly, it is possible to confirm the degree of modification of a resin by making use of fine particles of the carbonate ion-type anion-exchange resin as an index In addition, the carbonate ion-type anion-exchange resin fine particles can be used not only as the index material but also as water-insoluble fine particles for modification of synthetic resins.

EXAMPLE 3

Preparation of fine particles of an ammonium ion-type cation-exchange resin

After ammonia gas was brought into contact with an H-type cation-exchange resin ("Duolite C20", trade name; product of Sumitomo Chemical Co., Ltd.), the resin was ground in a pot mill. Water was added to the resin thus ground into a slurry having a concentration of 3%, to which an OH-type anion-exchange resin was added, so that the slurry was subjected to an anion-exchange treatment until its pH was turned to 10.7. The OH-type anion-exchange resin used was then filtered off. The particles in the slurry were deflocculated, so that a uniform dispersion was obtained.

This dispersion was left at rest and an upper portion of the dispersion, which corresponded to Stokes diameters of 2 μm or smaller was then collected. The dispersion thus collected was treated with an H-type cation-exchange resin, so that fine particles in the slurry rapidly sedimented. Therefore, these fine particles of an ammonium ion-type cation-exchange resin were able to recovered as an aqueous slurry $S_4$ having a concentration of 25% by a centrifugal separator.

The electrical conductivity and pH of the slurry $S_4$ were 21 μS/cm and 6.2 respectively.

When heated to 150°–200° C., this slurry $S_4$ caused ion-exchange reaction between ammonium ions and sodium ions to be quantitatively advanced even in a solution or dispersion of a synthetic resin, whereby ammonia gas was generated. It was confirmed that 1 l of the slurry $S_4$ reacts with 400 milli-equivalent (for example, 9 g in the case of sodium ions) of cations.

Therefore, it is possible to confirm the degree of modification of a resin by making use of fine particles of the ammonium ion-type cation-exchange resin as an index material. In addition, the ammonium ion-type cation-exchange resin fine particles can be used not only as the index material but also as water-insoluble fine particles for modification of synthetic resins.

EXAMPLE 4

Preparation of fine particles of a white pigment

A commercially-available white pigment, whose composition was not known, was dispersed in a proportion of 30% in the same epoxy resin as that used in Comparative Experiment 1 in a conventional mill.

The amount of chloride anions in the resin was measured by dropwise adding the slurry $S_3$ of the carbonate ion-type anion-exchange resin fine particles in accordance with the determination method of Example 2. As a result,
was about 1,000 ppm and hence the same as that of the original resin. Accordingly, this white pigment had no function to fix chloride ions.

The white pigment was dispersed in deionized water into a slurry having a concentration of 25% so as to determine its electrical conductivity. It was 1,120 μS/cm and its pH was an acid as strong as 3.5.

The constituent elements of this white pigment are Ti, Al, Si, O and H. From this white pigment, a slurry having a concentration of 3% was prepared using deionized water. To this slurry, was added an OH-type anion-exchange resin ("Duolite A101", trade name; product of Sumitomo Chemical Co., Ltd.) so as to subject the slurry to an ion-exchange treatment. The pH value of the slurry was stabilized at 11.9. The OH-type anion-exchange resin used was filtered off and the residue was left at rest. Particles in the slurry were deflocculated, so that a uniform dispersion was obtained.

An upper portion of the dispersion of a sedimentation distance corresponding to Stokes diameters of 2 μm or smaller was collected. The dispersion thus collected was then treated with an H-type cation-exchange resin ("Duolite C20", trade name; product of Sumitomo Chemical Co., Ltd.), so that fine particles in the slurry rapidly sedimented. Therefore, these fine particles were recovered as a slurry $S_5$ having a concentration of 25% by a centrifugal separator. The electrical conductivity and pH of the slurry $S_5$ were 35 μS/cm and 6 respectively.

Preparation of a modified resin

A 5-l glass flask was charged with 2 kg of the same epoxy resin as that used in Comparative Experiment 1 and 1 kg of xylene, to which 2.4 kg of the slurry $S_5$ was gradually added under refluxing.

Water in the slurry $S_5$ was eliminated by forming an azeotropic mixture with xylene. At last, xylene was evaporated to obtain 2.6 kg of a modified resin (epoxy resin containing the white pigment fine particles). The amount of chloride anions in the modified resin was measured by drop-wise adding the slurry $S_3$ of the carbonate ion-type anion-exchange resin fine particles in accordance with the determination method of Example 2, and was found to be reduced to 10 ppm or smaller. Therefore, it can be considered that chloride ions were substantially completely fixed in the white pigment fine particles.

On the assumption that chloride ion-fixing ability has been developed on this white pigment, specific analysis was conducted. As a result, it was confirmed that fine particles having anion-exchange function are present. As described above, the pigment was subjected to a deionization treatment so as to induce the anion-exchange function and the chloride ions in the epoxy resin were fixed in the thus-treated pigment, thereby achieving the modification of the resin.

EXAMPLE 5

Preparation of fine particles of kaolinite

Many kinds of fine particles having cation-exchange function are known in the natural world. For example, kaolinite has cation-exchange function. However, kaolinite has heretofore been used as an extender pigment, an extender or the like in the field of paints. It has not been considered that kaolinite has anticorrosive function. That reason is attributed to the fact that conventional kaolinite is not in the form of fine particles in which impurities such as electrolytes have been eliminated sufficiently.

A slurry having a concentration of 2% was prepared from commercially-available kaolinite particles with deionized water, and was added with an OH-type anion-exchange resin ("Duolite A101", trade name; product of Sumitomo Chemical Co., Ltd.) so as to subject the slurry to an ion-exchange treatment. The pH value of the slurry was stabilized at 10.5. The OH-type anion-exchange resin used was filtered off and the residue was left at rest. Particles in the slurry were deflocculated, so that a uniform dispersion was obtained.

An upper portion of the dispersion of a sedimentation distance corresponding to Stokes diameters of 2 μm or smaller was collected. The dispersion thus collected was then treated with an H-type cation-exchange resin ("Duolite C20", trade name; product of Sumitomo Chemical Co., Ltd.), so that fine particles in the slurry rapidly sedimented. Therefore, these fine particles were recovered as a slurry $S_6$ having a concentration of 25% by a centrifugal separator. The electrical conductivity of the slurry $S_6$ was 60 μS/cm and its pH was an acid as considerably strong as 4.0.

The fact that the pH of the slurry $S_6$ is 4.0 indicates that its own hydrogen ion concentration is high. The electrical conductivity based on this hydrogen ion concentration is approximately 35 μS/cm ($Y=0.03498\times 10^{(7-X)}$). Therefore, the electrical conductivity based on electrolyte ions of impurities (including counter cation species required for the presence of hydrogen ions is 25 μS/cm (60−35). The fine particles can hence be considered to be purified to a good level.

Preparation of a modified resin

In a similar manner to Example 4, a 5-l glass flask was charged with 2 kg of the same epoxy resin as that used in Comparative Experiment 1 and 1 kg of xylene, to which 2.4 kg of the slurry $S_6$ was gradually added under refluxing.

Water in the slurry $S_6$ was eliminated by forming an azeotropic mixture with xylene. At last, xylene was evaporated to obtain 2.6 kg of a modified resin (epoxy resin containing kaolinite fine particles). The amount of chloride anions in the modified resin was measured by drop-wise adding the slurry $S_3$ of the carbonate ion-type anion-exchange resin fine particles in accordance with the determination method of Example 2, and was found to be 230 ppm.

Therefore, the chloride ions in the modified resin were reduced widely from 1000 ppm of the original resin to 230 ppm. Since these kaolinite fine particles are a cation exchanger, they cannot be considered to have an effect to fix chloride ions. However, the chloride ions decreased as a matter of fact.

The reason why chloride ions are eliminated is presumed that cations such as sodium ions, which are contained in the epoxy resin, are fixed in the kaolinite fine particles and hydrogen ions $H^+$ liberated by ion exchange bond to chloride ions $Cl^-$ into hydrochloric acid, so that hydrochloric acid is eliminated by evaporation.

The fact that as described above, kaolinite, which has heretofore been treated as an mere extender pigment or extender, turns, by purifying it and preparing into fine particles, into that having ion-exchange function, by which chloride ions in a resin are eliminated, is a novel finding.

EXAMPLE 6

Improvement of a water-based resin

A commercially-available acrylic emulsion was charged in a closed glass flask. While water as a solvent was refluxed under reduced pressure, the slurry $S_5$ of the white pigment fine particles, which had been obtained in Example 4, was added over 4 hours to give a concentration of 20% (in terms of solids) based on the resin.

Under refluxing, the slurry $S_3$ of the carbonate ion-type anion-exchange resin fine particles was added dropwise by a quantitative buret. During the refluxing, a fraction was intermittently collected to inspect the state of generation of carbon dioxide gas, and the moment no generation of carbon dioxide gas was detected was defined as the end point of reaction.

During the above process, the temperature was maintained at room temperature to prevent the emulsion from breaking. A portion of the solvent was removed by evaporation to control the concentration of the fluid resin, thereby completing the improvement of the fluid resin.

When the emulsion of the modified resin thus obtained was coated on a metal, the development of rust was markedly reduced compared with the case where the emulsion not modified was coated, and the separation of the coating film also scarcely occurred.

A 10% dilute liquid of the above modified resin emulsion was filled in a stainless beaker. Using a cold rolled steel plate as a cathode, a d.c. voltage of 200 V was applied for 3 minutes. A planar electrodeposition coating of 30 μm thick was obtained. For the sake of comparison, the emulsion not modified was coated. The coating film formed was a barnacle-like porous film and hence had no value as a coating.

I claim:

1. A method of modifying a synthetic resin, comprising treating a solution or dispersion of a synthetic resin containing water-soluble electrolytes as impurities with basic or acidic, water-insoluble fine particles which have an electrical conductivity ($\mu$S/cm) satisfying the following inequality (I) or (II) when measured as an aqueous suspension having a concentration of 25 wt. %, whereby cations originating in the electrolytes are fixed in the acidic fine particles or anions originating in the electrolytes are fixed in the basic fine particles:

for the basic fine particles:

$$Y < 0.01983 \times 10^{(X-7)} + 50 \text{ (I); and}$$

for the acidic fine particles:

$$Y < 0.03498 \times 10^{(7-X)} + 50 \text{ (II)}$$

wherein Y is the electrical conductivity ($\mu$S/cm) and X denotes the pH of the aqueous suspension.

2. The method of claim 1, wherein the basic fine particles are not at least one water-insoluble fine particles selected from basic clay minerals, hydroxyl-containing compounds of metals, carbonate-containing compounds of metals and fine particles of anion-exchange resins.

3. The method of claim 1, wherein the acidic fine particles are at least one water-insoluble fine particles selected from acidic clay minerals, metal oxides and fine particles of cation-exchange resins.

4. The method of claim 1, wherein 0.3-300 parts by weight of the basic or acidic, water-insoluble fine particles are added to a solution or dispersion containing 100 parts by weight of the synthetic resin and the treatment is conducted at a temperature lower than the temperature at which the synthetic resin is decomposed or hardened.

5. The method of claim 1, wherein the basic or acidic water-insoluble fine particles are added while the solution or dispersion of the synthetic resin is heated and/or decompressed to evaporate the solvent and the evaporated gas is condensed and refluxed.

6. A modified synthetic resin produced by a method comprising treating a solution of dispersion of a synthetic resin containing water-soluble electrolytes as impurities with basic or acidic, water-insoluble fine particles which have an electrical conductivity ($\mu$S/cm) satisfying the following inequality (I) or (II) when measured as an aqueous suspension having a concentration of 25 wt. %, whereby cations originating in the electrolytes are fixed in the acidic fine particles or anions originating in the electrolytes are fixed in the basic fine particles:

for the basic fine particles:

$$Y < 0.01983 \times 10^{(X-7)} + 50 \text{ (I); and}$$

for the acidic fine particles:

$$Y < 0.03498 \times 10^{(7-X)} + 50 \text{ (II)}$$

wherein Y is the electrical conductivity ($\mu$S/cm) and X denotes the pH of the aqueous suspension.

7. The modified synthetic resin of claim 6, wherein the cations originating in the electrolytes have been fixed in the acidic fine particles or the anions originating in the electrolytes have been fixed in the basic fine particles to an extent that when fine particles of a carbonate ion-type anion-exchange resin or fine particles of an ammonium ion-type cation-exchange resin, respectively are added as an index material to a solution or dispersion of the modified synthetic resin and the resultant mixture is heated and/or decompressed to evaporate solvent, the presence of carbon dioxide gas or ammonia gas becomes undetected in the evaporated gas.

8. The modified synthetic resin of claim 7, wherein the water-insoluble fine particles are contained in a proportion of 0.3-300 parts by weight per 100 parts by weight of the synthetic resin.

* * * * *